United States Patent [19]

Engle

[11] 4,375,671
[45] Mar. 1, 1983

[54] METHOD AND MEANS FOR FILTERING AND UPDATING PIXEL DATA

[75] Inventor: Gary L. Engle, Fair Oaks, Calif.

[73] Assignee: General Electric Company, Rancho Cordova, Calif.

[21] Appl. No.: 203,659

[22] Filed: Nov. 3, 1980

[51] Int. Cl.³ .................. G06F 15/20; H04N 5/14
[52] U.S. Cl. ............................ 367/11; 358/112; 358/166; 364/414
[58] Field of Search ............ 364/414, 515; 358/37, 358/112, 166, 284

[56] References Cited

U.S. PATENT DOCUMENTS

| | | | |
|---|---|---|---|
| 3,800,078 | 3/1974 | Cochran et al. | 358/166 X |
| 4,189,775 | 2/1980 | Inouye et al. | 364/414 |
| 4,212,072 | 7/1980 | Huelsman et al. | 364/515 |
| 4,272,820 | 6/1981 | Lux | 364/414 |
| 4,293,912 | 10/1981 | Walters | 364/414 |

*Primary Examiner*—Jerry Smith
*Attorney, Agent, or Firm*—Flehr, Hohbach, Test, Albritton & Herbert

[57] ABSTRACT

Pixel data stored in a display memory of an ultrasonic scanning system is updated in response to new pixel data generated from a reflected ultrasonic wave and stored pixel data. A lookup table of pixel values is provided in a second memory, and the second memory is addressed using the new pixel data and the stored pixel data. The value stored in the second memory at the address is then used to update the display memory.

6 Claims, 4 Drawing Figures

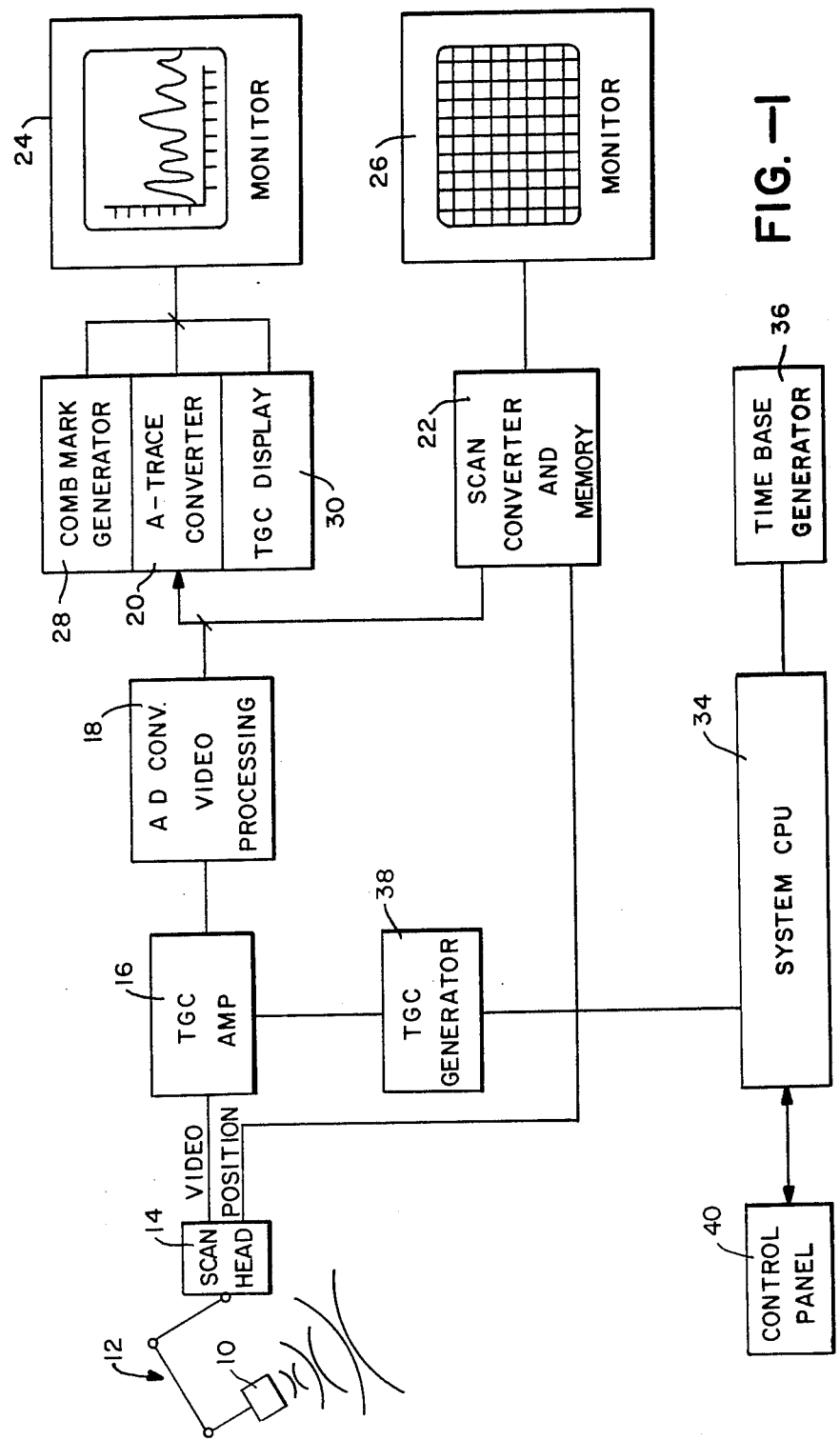
FIG. —1

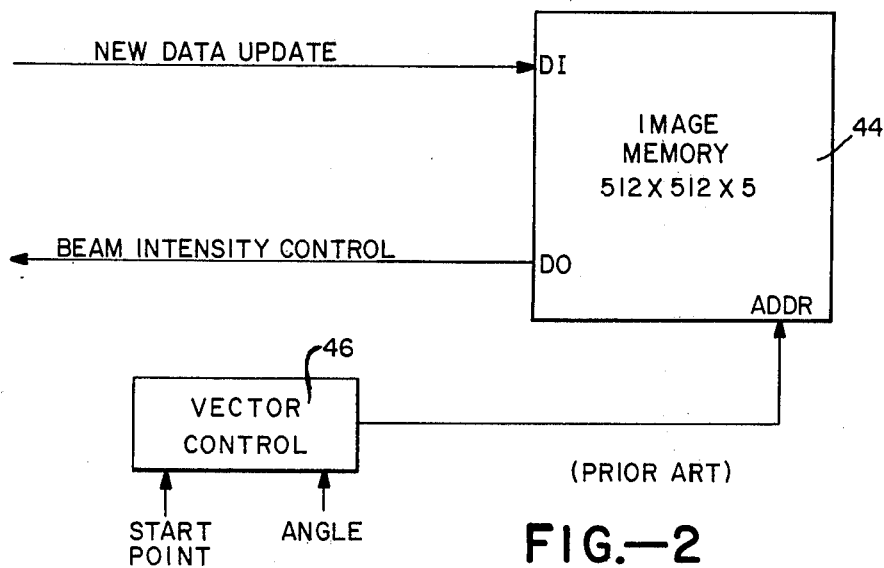
(PRIOR ART)
FIG.—2
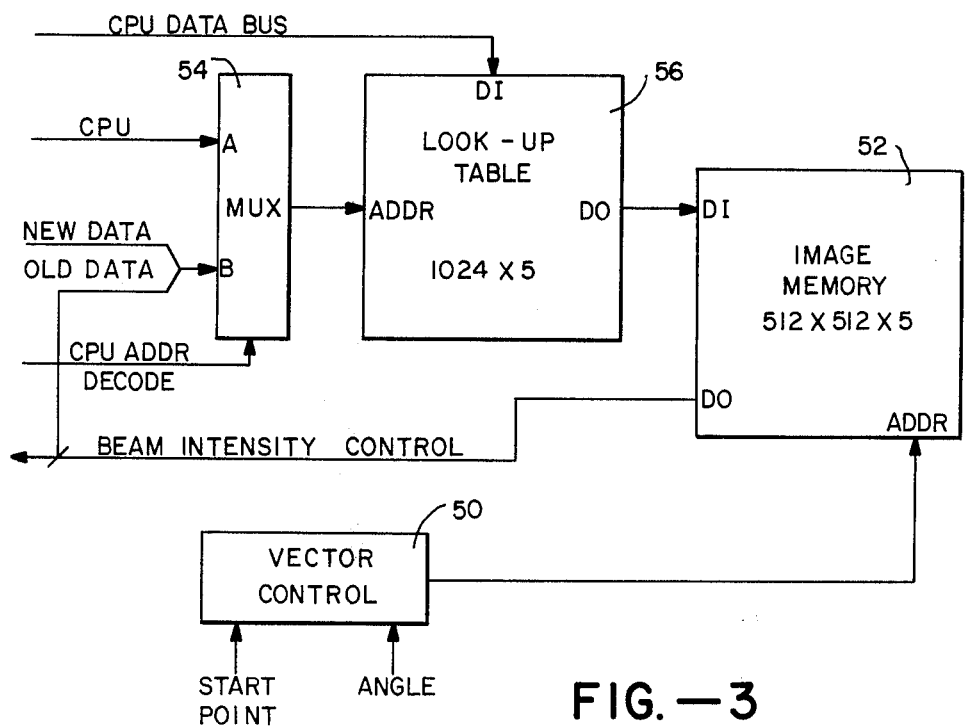
FIG.—3

METHOD AND MEANS FOR FILTERING AND UPDATING PIXEL DATA

This invention relates generally to ultrasonic scanners such as used for medical diagnostic purposes, and more particularly the invention relates to a method and means for providing improved display picture quality in such a system.

Ultrasonic diagnostic systems are known and commercially available for diagnostic purposes. See for example U.S. Pat. No. 4,172,386 for "Video A Trace Display System for Ultrasonic Diagnostic system" and U.S. Pat. No. 4,204,433 for "Computerized Ultrasonic Scanner With Technique Select". The commercially available Datason ultrasound system of General Electric Company provides both real time and static images on a television display.

Briefly, such systems utilize sound transducers to transmit ultrasonic (e.g. on the order of several megahertz) waves into a patient and to receive echo signals. The transducer is attached to a plurality of hinged arms for movement in a single plane, and potentiometers associated with the hinged arms produce signals which identify the transducer position. The echo signals are applied to a time gain compensated amplifier to adjust the echo signals for attenuation in passing through the patient. The adjusted signals are then passed through an analog to digital conversion and video processing circuitry and thence to scan converter circuitry for display formatting. The display comprises a plurality of pixels in horizontal rows and vertical columns with each pixel having a brightness level in response to the input signal. Conventionally, the brightness is defined by a 32 level Gray-scale, hence the pixel brightness level requires a 5 bit digital code. The pixel brightness codes are stored in a random access memory with the memory periodically updated in response to video signals produced from the ultrasonic scanner.

The ultrasound system can be operated in several modes of display. For example, in the compound mode stored values of pixels are allowed to increase as an area corresponding to the pixel is rescanned, assuming that the newer pixel value is greater than the stored pixel value. However, compound mode can lead to display distortions if the pixels are rescanned too often as the stored values tend to increase to maximum pixel values.

On the other hand, in the survey mode the stored value for a pixel is replaced each time the area corresponding to the pixel is scanned, thus the stored values can increase or decrease in response to repeated scans. However, the display images in the survey mode can be very coarse and speckled. When the display image is dynamic as in real time mode, the human eye filters out some of the coarseness, but with a static or frozen image the coarseness and speckles degrade the image.

Accordingly, an object of the present invention is a method of selectively updating stored pixel data and providing enhanced display pictures.

Another object of the invention is apparatus for updating stored pixel data whereby the stored data is a function of the previously stored data and data from the latest scan.

Briefly, in accordance with the present invention pixel data to be displayed is stored in a first random access memory. A second random access memory stores values of pixel data for updating the first memory. The second memory is addressed by using the present intensity value for a pixel and the intensity value for the pixel as stored in the first memory. The corresponding intensity value stored in the second memory is then used to update the first memory for the pixel.

In a preferred embodiment in which the intensity value is defined by a 5 bit code, the second memory must include 1,024 storage locations addressable by the two 5 bit intensity codes.

In effect, a lookup table is provided in the second memory with the table defined in terms of the present intensity level and the stored intensity level. Accordingly, the table may represent an average value of the two intensity levels, or the table may provide the greater of the two intensity levels when one of the intensity levels is below the threshold value for a display electron beam. Thus, a selective filtering of data for updating the first memory can be provided.

The invention and objects and features thereof will be more readily apparent from the following detailed description and appended claims when taken with the drawing, in which:

FIG. 1 is a functional block diagram of an ultrasound scanner system.

FIG. 2 is a functional block diagram of the image memory portion of the system of FIG. 1.

FIG. 3 is a functional block diagram of an image memory and the update circuitry therefor in accordance with one embodiment of the present invention.

Figure 4:
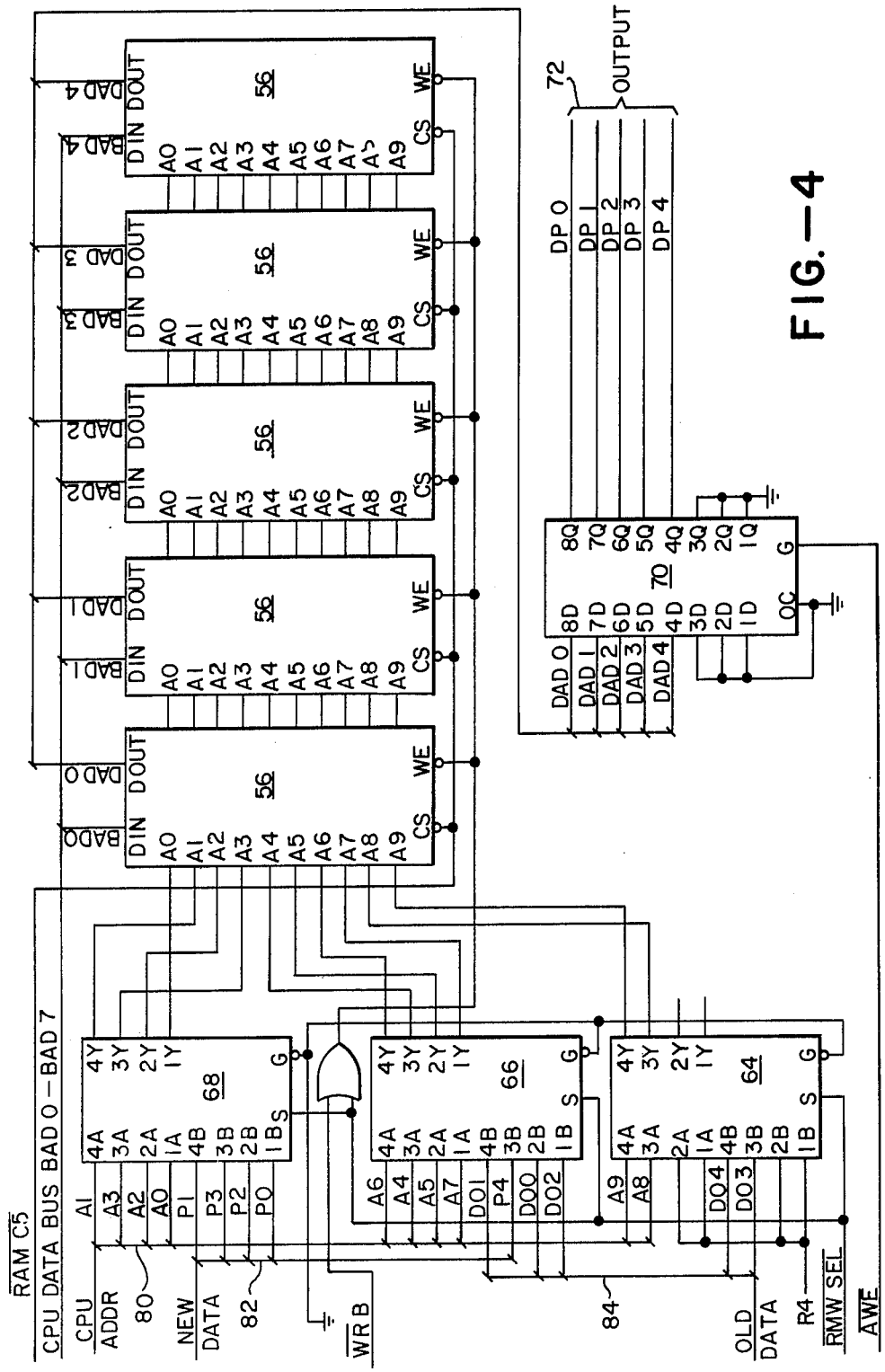
FIG. 4 is a detailed functional block diagram of one embodiment of the circuitry of FIG. 3.

Referring now to the drawings, FIG. 1 is a functional block diagram of an ultrasonic scanner. The system includes transducer 10 mounted on a hinged arm system shown generally at 12 whereby transducer 10 can move freely in a single plane. Potentiometers in scan head 14 and associated with the arms of the system generate start point and angle signals indicative of the X and Y position of the scanner 10 in the plane of motion.

Scanner 10 transmits ultrasonic signals (e.g. on the order of 5 megahertz) and generates electrical signals in response to reflections of transmitted ultrasonic signals. The generated signals are attenuated in time due to attenuation of the ultrasonic signal passing through a patient.

The attenuated video signal is then applied to time gain compensated amplifier 16, and the amplified signal is then applied to analog to digital conversion and video processing circuitry 18. The output of circuitry 18 is then applied to A trace converter circuitry 20 and to scan converter and memory circuitry 22 which generate the signals for controlling television monitors 24 and 26, respectively.

The A trace converter generates a signal for real time display of the amplitude of each reflected ultrasonic wave. The A trace data applied to monitor 24 identifies a horizontal position on the monitor (e.g. 1,000 positions) and an amplitude or vertical position associated with each X position. This data controls the intensity of the electron beam in the display during raster scanning of the beam. Scale markings for the displayed A trace are generated by Comb mark generator 28, and a time gain compensation curve is provided by generator 30.

A section view of the patient is displayed on monitor 26 in response to the scan converter and memory 22. The signal from circuitry 18 is converted for storage in a 512 by 512 memory matrix with each point of the matrix accommodating a 5 bit brightness code. The matrix corresponds to the pixels on the display of monitor 26 with the brightness code being indicative of the Gray-scale for the pixels.

System control is provided by central processing unit 34 which also drives the time base generator 36 which generates the timing signals for the system. A time gain compensation (TGC) control generator 38 generates the control signal for amplifier 16 and a control panel 40 is provided for manual control of the system for the central processing unit.

FIG. 2 is a functional block diagram of the image memory portion of the scan converter and memory 22 of FIG. 1. As above indicated, the image memory 44 is a random access memory having storage locations corresponding to the pixels of the display of monitor 26. In the Datason system for example, the display comprises an array of pixels corresponding to 512 X positions and 512 Y positions, and the signal intensity for each pixel is defined by 5 bit code. Consequently, memory 44 has 512 X addresses, 512 Y addresses, with each X and Y location accommodating 5 bits of data.

As an ultrasonic beam is transmitted through a patient, a vector generator 46 in the scan converter 22 receives the start point and angle of the ultrasonic transducer and therefrom generates a vector including a plurality of addressable pixels. These pixel addresses are used to address and update memory 44 with the data at the address read out for beam intensity control in the monitor. As data for a pixel is read out of memory 44, the new data can be provided to the memory to update the pixel. In the compound mode of operation, memory 44 is updated only if the new data is greater than the stored pixel data. However, in the survey mode of operation the new data will update the stored pixel data whether or not the new pixel data is greater than the stored pixel data. As above noted, in the survey mode of operation the display picture appears degraded due to the coarseness of the image and speckles appearing in the image.

In accordance with the present invention data for updating the image memory is based on the old and new pixel values. By so combining the two values, such as by averaging, the resultant filtering of the pixel values has a positive effect on the display image. FIG. 3 is a functional block diagram of one embodiment of apparatus for updating the image memory in accordance with the invention. A pixel address provided by vector generator 50 addresses the image memory 52. The new pixel intensity data along with the old data from the addressed memory 52 are applied through a multiplexer 54 to address a lookup table in memory 56. Stored in memory 56 are pixel intensity values as a function of the new pixel data and the old pixel data from memory 52. In one embodiment in which the intensity values are 5 bits of data, the lookup table 56 comprises 1,024 locations with each location accommodating 5 bits of data. The value in the lookup table in memory 56 is then applied to update image memory 52 at the particular pixel address.

The values in the lookup table are initially loaded by the CPU with data transferred on the data bus as the lookup table is addressed by the CPU through the multiplexer 54. Further, modifications to the lookup table can be made under CPU control. Accordingly, the filtering function provided by the table can be varied.

FIG. 4 is a more detailed functional block diagram of one implementation of the circuitry of FIG. 3 in the Datason system. Commercially available components are indicated in parentheses, and the same reference numerals in FIG. 3 are used in FIG. 4 for like elements. The lookup table 56 comprises 5 interconnected 1,024 bit memories, (INTEL 2125AL) which can be initially loaded by the CPU data bus line interconnected with the data in (DIN) terminals of the memories. The multiplexer 54 comprises multiplexers 64, 66, and 68 (National 74S158). Data out from the lookup table 56 is provided to an output register 70 (National 74S373), latched when stable with signal AWE, and thence to output lines 72.

The CPU can address the lookup table memories 56 through the CPU data bus and CPU generated addresses are applied on line 80 along with CPU generated select RMWSEL. The new data address is provided to the lookup table through lines 82 which are connected to multiplexers 66 and 68. The old data read from the image memory is applied on lines 84 to multiplexers 64 and 66. Thus, the combined multiplexers can accept the old data and the new data for addressing the lookup table in memories 56, or the multiplexers can apply CPU generated address and CPU data for addressing the lookup table.

By using a combination of old data and new data for updating the memory of stored pixel data in accordance with the invention, an improved display image is provided. The filtering of the data is readily varied by changing the values in the lookup table. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. In an ultrasonic scanner system in which video scanned data is defined for a plurality of addressable pixels in an electron beam display, a method of selectively updating stored pixel data in response to repetitive ultrasonic beam scans comprising the steps of storing pixel data to be displayed in a first random access memory, storing filtered values of pixel data in a second random access memory, each filtered value being intermediate two address values for the filtered value, establishing a present intensity value for a pixel in response to an acoustic beam scan, obtaining from said first random access memory the stored intensity value for said pixel, addressing said second random access memory using said present intensity value and said stored intensity value as a memory address, updating said first random access memory for said pixel with said filtered value addressed in said second random access memory when said present value and said stored value are both above a threshold, and updating said second random access memory for said pixel value with one address value when the other threshold value is below said threshold.

2. The method of selectively updating stored pixel data as defined by claim 1 wherein pixel intensity values defined by 5 bit code and said second memory comprises 1,024 storage locations each having a 5 bit capacity.

3. In an ultrasonic scanner system in which ultrasonic beam scan data is defined for a plurality of addressable pixels in an electron beam display, apparatus for updating stored pixel data in response to repetitive ultrasonic beam scans comprising
a first random access memory for storing pixel data to be displayed,
a second random access memory for storing a table of values of pixel data, said table being addressable by codes representing two pixel values, said table including an intermediate value between a present intensity value and a stored intensity value when said present intensity value and said stored intensity value are both greater than a threshold value, and said stored values including the greater intensity value of said present intensity value and said stored intensity value when one of said present intensity value and said stored intensity value is less than a threshold value, and
means for updating said first random access memory with a stored value of pixel data in said second random access memory.

4. Apparatus for updating stored pixel data as defined by claim 3 and further including means for addressing said second random access memory using the value of a pixel from an ultrasonic beam scan and a stored value in said first random access memory for said pixel.

5. Apparatus for updating pixel data as defined by claim 4 wherein pixel intensity value is defined by a 5 bit code and said second memory comprises 1,024 storage locations each having 5 bit capacity.

6. An ultrasonic scanner system comprising
transducer means for transmitting ultrasonic waves and generating electrical signals in response to reflected ultrasonic waves,
means for converting said electrical signals to digital intensity values corresponding to a plurality of pixels in an electronic beam display,
first accessible memory means for storing said digital intensity values corresponding to said plurality of pixels for controlling the electron beam of said display,
second accessible memory means for storing a table of intensity values, said table including an intermediate value between a present intensity value and a stored intensity value when said present intensity value and said stored intensity value are both greater than a threshold value, and said stored values including the greater intensity value of said present intensity value and said stored intensity value when one of said present intensity value and said stored intensity value is less than a threshold value,
means responsive to the intensity value of a pixel from an ultrasonic beam scan and to a stored value in said first accessible memory for addressing said second accessible memory means, and
means for updating stored pixel data in said first accessible memory means with the value addressed in said second accessible memory means.

* * * * *